United States Patent
Niitsuma (10) Patent No.: US 10,637,349 B2
(45) Date of Patent: Apr. 28, 2020

(54) IMAGE FORMING APPARATUS AND CONTROL METHOD OF IMAGE FORMING APPARATUS CONTROLLING A POWER FACTOR CORRECTION CIRCUIT

(71) Applicant: CANON KABUSHIKI KAISHA, Tokyo (JP)

(72) Inventor: Hiroaki Niitsuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/150,826

(22) Filed: Oct. 3, 2018

(65) Prior Publication Data
US 2019/0115827 A1 Apr. 18, 2019

(30) Foreign Application Priority Data
Oct. 12, 2017 (JP) .................................. 2017-198395

(51) Int. Cl.
| | | |
|---|---|---|
| G06F 15/00 | (2006.01) | |
| G06F 3/12 | (2006.01) | |
| G06K 1/00 | (2006.01) | |
| H02M 1/42 | (2007.01) | |
| H02M 1/36 | (2007.01) | |
| H02M 1/12 | (2006.01) | |
| H02M 1/14 | (2006.01) | |
| H04N 1/00 | (2006.01) | |
| H02M 1/00 | (2006.01) | |

(52) U.S. Cl.
CPC ............. H02M 1/425 (2013.01); H02M 1/12 (2013.01); H02M 1/143 (2013.01); H02M 1/36 (2013.01); H02M 1/4225 (2013.01); H04N 1/00888 (2013.01); H02M 2001/0032 (2013.01)

(58) Field of Classification Search
CPC ........ H02M 1/425; H02M 1/12; H02M 1/143; H04N 1/00888
USPC ................................. 358/1.1, 1.9, 1.13, 1.15
See application file for complete search history.

(56) References Cited

U.S. PATENT DOCUMENTS

| 8,140,875 | B2 | 3/2012 | Tatsumi | |
|---|---|---|---|---|
| 2003/0095421 | A1* | 5/2003 | Kadatskyy | H02M 1/34 363/65 |
| 2016/0139548 | A1* | 5/2016 | Kosaka | G03G 15/2039 399/67 |

(Continued)

FOREIGN PATENT DOCUMENTS

JP 2009-134576 A 6/2009

OTHER PUBLICATIONS

U.S. Appl. No. 16/124,718, filed Sep. 7, 2018 by Hiroaki Niitsuma.

Primary Examiner — Douglas Q Tran
(74) Attorney, Agent, or Firm — Venable LLP (57) ABSTRACT

The image forming apparatus of the present invention includes: a power source unit having a PFC (Power Factor Correction) circuit; a semiconductor integrated circuit including at least one module for performing image processing; and a first power source control unit configured to control whether to turn on or to turn off a power of the PFC circuit, and to control a power control signal input into the semiconductor integrated circuit so that the power of the PFC circuit is on while the power of the module in the semiconductor integrated circuit is on.

21 Claims, 7 Drawing Sheets

(56) References Cited

U.S. PATENT DOCUMENTS

2018/0095516 A1\* 4/2018 Kozuka ............... H02M 1/4225
2018/0131830 A1\* 5/2018 Hashimoto ......... H02M 1/4208

\* cited by examiner

IMAGE FORMING APPARATUS AND CONTROL METHOD OF IMAGE FORMING APPARATUS CONTROLLING A POWER FACTOR CORRECTION CIRCUIT

BACKGROUND OF THE INVENTION

Field of the Invention

The present invention relates to an image forming apparatus that controls a power source for reducing power consumption, a control method of an image forming apparatus, and a storage medium.

Description of the Related Art

In an image forming apparatus that operates on power supplied from a commercial power source, such as a multi function printer having functions of copy, print, scan, and so on, a power source unit configured to convert an alternating-current power source into a direct-current power source is provided inside the image forming apparatus. In the image forming apparatus such as this, for example, power as large as 1 kW is consumed at the time of execution of a job, such as a print job, but on the other hand, at the time of standby of a job, power consumption is reduced to 1 W or lower.

In view of the situation of power consumption in the image forming apparatus such as this, conventionally, a PFC (Power Factor Correction) circuit is mounted on the power source unit of the image forming apparatus. This PFC circuit is a circuit that improves a power factor by shaping a disturbance in the current waveform of an alternating-current power source that is input and by making the waveform similar to a voltage waveform, making it possible to prevent noise trouble from occurring and to improve power consumption efficiency by reducing harmonic components for the power source line.

Here, in the image forming apparatus, with low power consumption, such as 1 W, there is almost no trouble due to harmonic components, and therefore, no trouble is caused even in the case where the PFC circuit is turned off. Further, on the contrary, it is effective to reduce the power loss on the alternating-current side by turning off the PFC circuit in order to reduce the power consumption at the time of standby to 1 W or lower in the power source unit.

However, in the case where the PFC circuit is turned off, the upper limit of power that can be supplied in the power source unit is limited compared to the upper limit of power that can be supplied in the power source unit while the PFC circuit is on. Because of this, in the case where the PFC circuit is turned off, it is necessary to suppress the total power consumption of various devices of the image forming apparatus to within the upper limit of power that can be supplied in the power source unit.

Then, in relation to this, it is known that power is consumed comparatively significantly in a semiconductor integrated circuit mounted on the image forming apparatus and in addition, a technique to reduce power consumption in a semiconductor integrated circuit is also known. For example, Japanese Patent Laid-Open No. 2009-134576 has disclosed a technique to reduce power consumption in a semiconductor integrated circuit by shutting off a power source that is supplied to a function module not in use by a control unit inside the semiconductor integrated circuit.

However, the technique disclosed in Japanese Patent Laid-Open No. 2009-134576 supposes a configuration in which the power source of a function module is shut off by the control unit (CPU) inside the semiconductor integrated circuit, and therefore, in the case where a heavy load is applied to the CPU, it is no longer possible to shut off the power source of a function module. Because of this, in the case where the PFC circuit is turned off in the state where it is not possible to control (shut off) the power source of a function module inside the semiconductor integrated circuit, power exceeding the upper limit of power that can be supplied in the power source unit is supplied.

SUMMARY OF THE INVENTION

According to the present invention, on the premise that the power consumption of an electronic device, such as an image forming apparatus on which a semiconductor integrated circuit is mounted, is suppressed to within the upper limit of supplied power that is permitted in the power source unit including a PFC circuit, the power consumption is reduced irrespective of whether or not the control of the power source from inside the semiconductor integrated circuit is possible.

In order to achieve the above-described object, the image forming apparatus of the present invention includes: a power source unit having a PFC (Power Factor Correction) circuit; a semiconductor integrated circuit including at least one module for performing image processing; and a first power source control unit configured to control whether to turn on or to turn off a power of the PFC circuit, and to control a power control signal input into the semiconductor integrated circuit so that the power of the PFC circuit is on while the power of the module in the semiconductor integrated circuit is on.

Further features of the present invention will become apparent from the following description of exemplary embodiments with reference to the attached drawings.

DESCRIPTION OF THE EMBODIMENTS

In the following, preferred embodiments of the present invention are explained in detail with reference to the attached drawings. The following embodiments are not intended to limit the present invention and further, all combinations of features explained in the present embodiments are not necessarily indispensable to the solution of the present invention.

First Embodiment

<Image Forming Apparatus>

Figure 1:
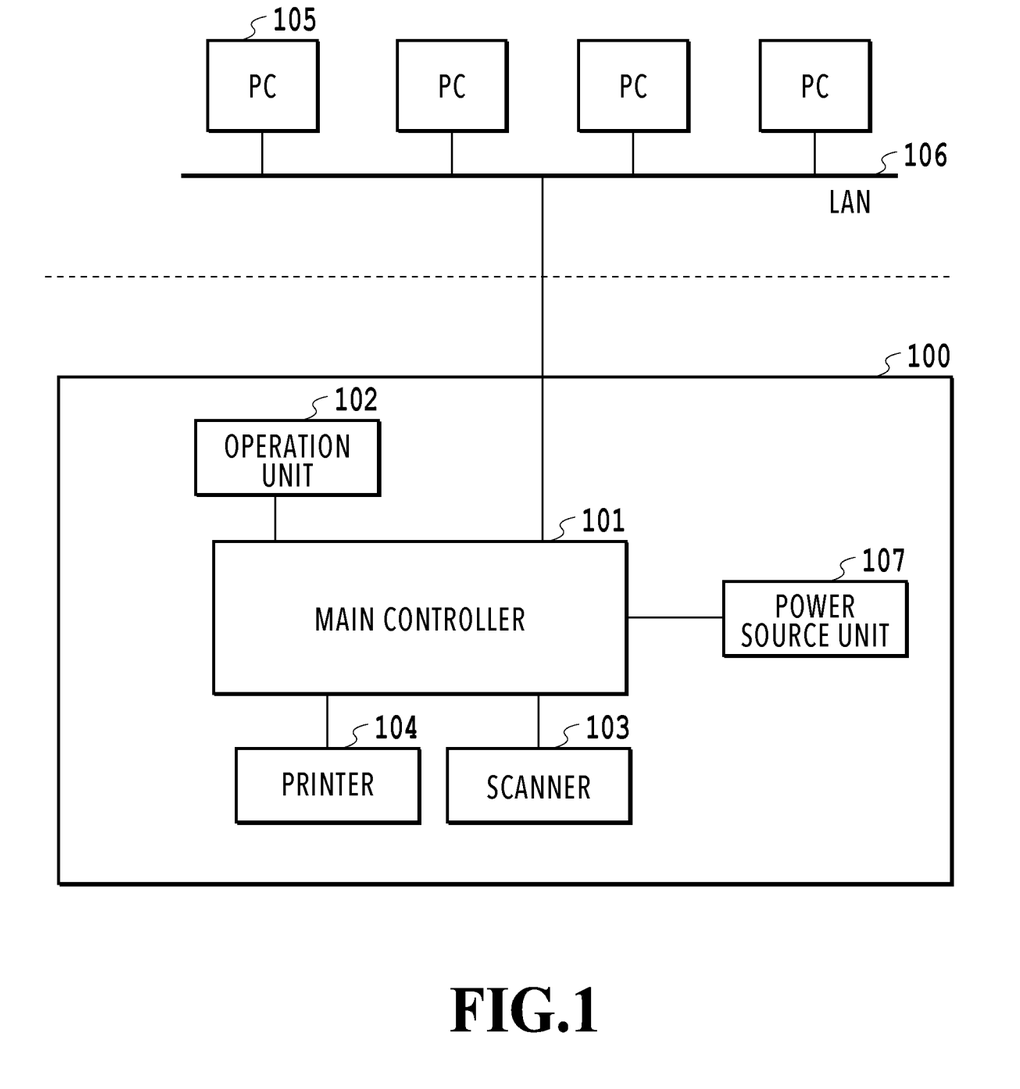
FIG. 1 is a block diagram showing a system configuration of an image forming apparatus.

FIG. 1 is a diagram showing a configuration of an image forming system. As shown in FIG. 1, the image forming system includes an image forming apparatus 100 and PCs (Personal Computers) 105. Further, the image forming apparatus 100 (in more detail, a main controller 101 of the image forming apparatus 100) and the PC 105 are connected so as to be capable of communication by a predetermined network, such as a LAN (Local Area Network) 106.

In the configuration of the image forming system, by a user giving instructions to perform printing from an application that runs on the PC 105, a print job of the image forming apparatus 100 is transmitted from the PC 105 to the image forming apparatus 100.

The image forming apparatus 100 is a multi function printer that performs various kinds of image processing, such as copy, print, and scan, and inputs and outputs images (that is, a printer and a scanner are mounted) and on the image forming apparatus 100, as will be described later in FIG. 4, a semiconductor integrated circuit 300 is mounted.

As shown in FIG. 1, the image forming apparatus 100 includes, as a configuration thereof, the main controller 101, an operation unit 102, which is a user interface, a scanner 103, which is an image input device, a printer 104, which is an image output device, and a power source unit 107.

The operation unit 102, the scanner 103, and the printer 104 are connected to the main controller 101, respectively, and are controlled by instructions (commands) from the main controller 101. The operation unit 102 is used in the case where various operations are performed. The scanner 103 generates image data by reading a document. The printer 104 performs printing on a printing medium, such as a sheet. The power source unit 107 is the power source of the image forming apparatus 100 and converts an alternating-current power source into a direct-current power source and supplies the power source to each unit within the image forming apparatus 100.

Figure 2:
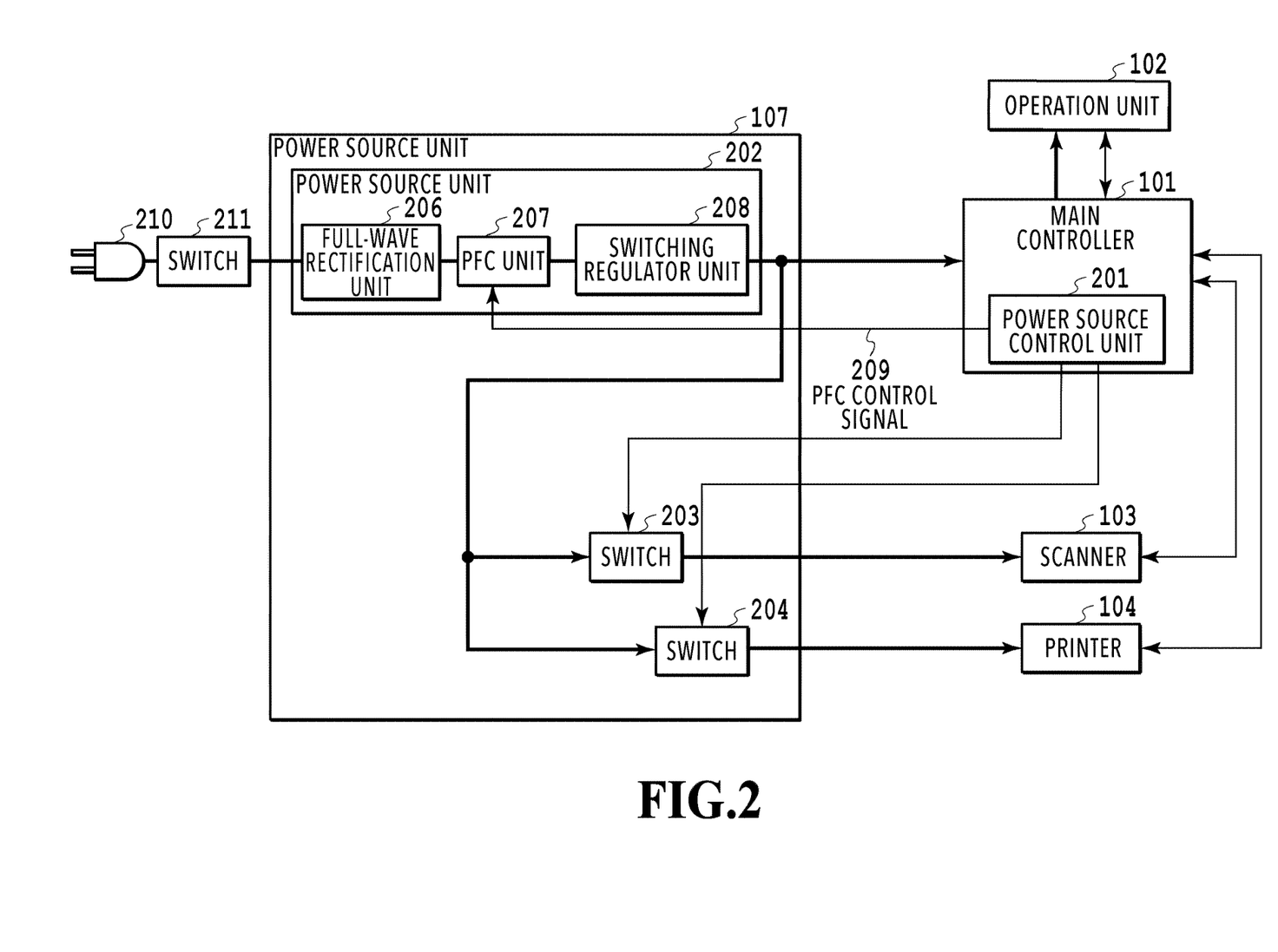
FIG. 2 is a block diagram showing a power source configuration of the image forming apparatus.

FIG. 2 is a block diagram showing a power source configuration of the image forming apparatus 100. In the power source configuration shown in FIG. 2, in the case where a power source switch 211 is switched to the on state by the operation of a user, the commercial alternating-current power source is supplied to a power source unit 202 of the power source unit 107 from a power source plug 210.

The power source unit 202 generates a direct-current power source from the supplied alternating-current power source and supplies the direct-current power source to the main controller 101, the operation unit 102, the scanner 103, and the printer 104. The image forming apparatus 100 has two kinds of operation mode: a normal mode in which power consumption at the time of performing a job, such as copy, print, and scan, is high and a power-saving mode in which power consumption at the time of standby without performing any job is low. The transition between the operation modes is implemented by a power source control unit 201 of the main controller 101 controlling on and off mainly of a switch 203 for supplying a power source to the scanner 103 and a switch 204 for supplying a power source to the printer 104. Consequently, for example, in the case where the mode is caused to make a transition into the power-saving mode from the normal mode, the switches 203 and 204 are controlled so as to be turned off. Further, due to this, it is possible to make an attempt to reduce the power consumption of the scanner 103 and the printer 104.

Next, the configuration inside the power source unit 202 is explained. As shown in FIG. 2, the power source unit 202 includes a full-wave rectification unit 206, a PFC unit 207, and a switching regulator unit 208 configured to convert a voltage into a predetermined voltage.

The full-wave rectification unit 206 performs full-wave rectification for an alternating-current power source. The PFC unit 207 includes a PFC circuit (that is, a circuit that improves a power factor by shaping a disturbance in the power source waveform of an alternating-current power source that is input and by making the waveform similar to a voltage waveform). Then, by causing the PFC unit 207 to include a PFC circuit as described above, the harmonic components for the power source line are reduced, the occurrence of noise trouble is prevented, and further, improvement of power consumption efficiency is implemented.

Regarding the PFC circuit, in the case where the image forming apparatus 100 is in the power-saving mode, the power consumption is low and there is almost no trouble due to harmonic components, and therefore, no trouble will occur in the image forming apparatus 100 even in the case where the PFC circuit is turned off. Further, on the other hand, it is also significant to reduce the power loss in the PFC circuit in order to further reduce the power consumption of the image forming apparatus 100 in the power-saving mode.

Consequently, as shown in FIG. 2, the configuration is made so that a PFC control signal 209 is input to the PFC unit 207 (PFC circuit) from the power source control unit 201 and the power source control unit 201 controls the operation of the PFC unit 207 between on and off by using the PFC control signal 209. Due to this, in the normal mode in which power consumption is high, the power factor is improved by turning on the PFC unit 207 and further, in the power-saving mode in which power consumption is low, power loss is reduced by turning off the PFC unit 207.

However, in the power-saving mode, in the state where the PFC unit 207 is off, the upper limit of power that can be supplied by the power source unit 202 is set lower than the upper limit of power that can be supplied in the normal mode. That is, in the power-saving mode, the upper limit of power consumption is limited to a low level.

Figure 3:
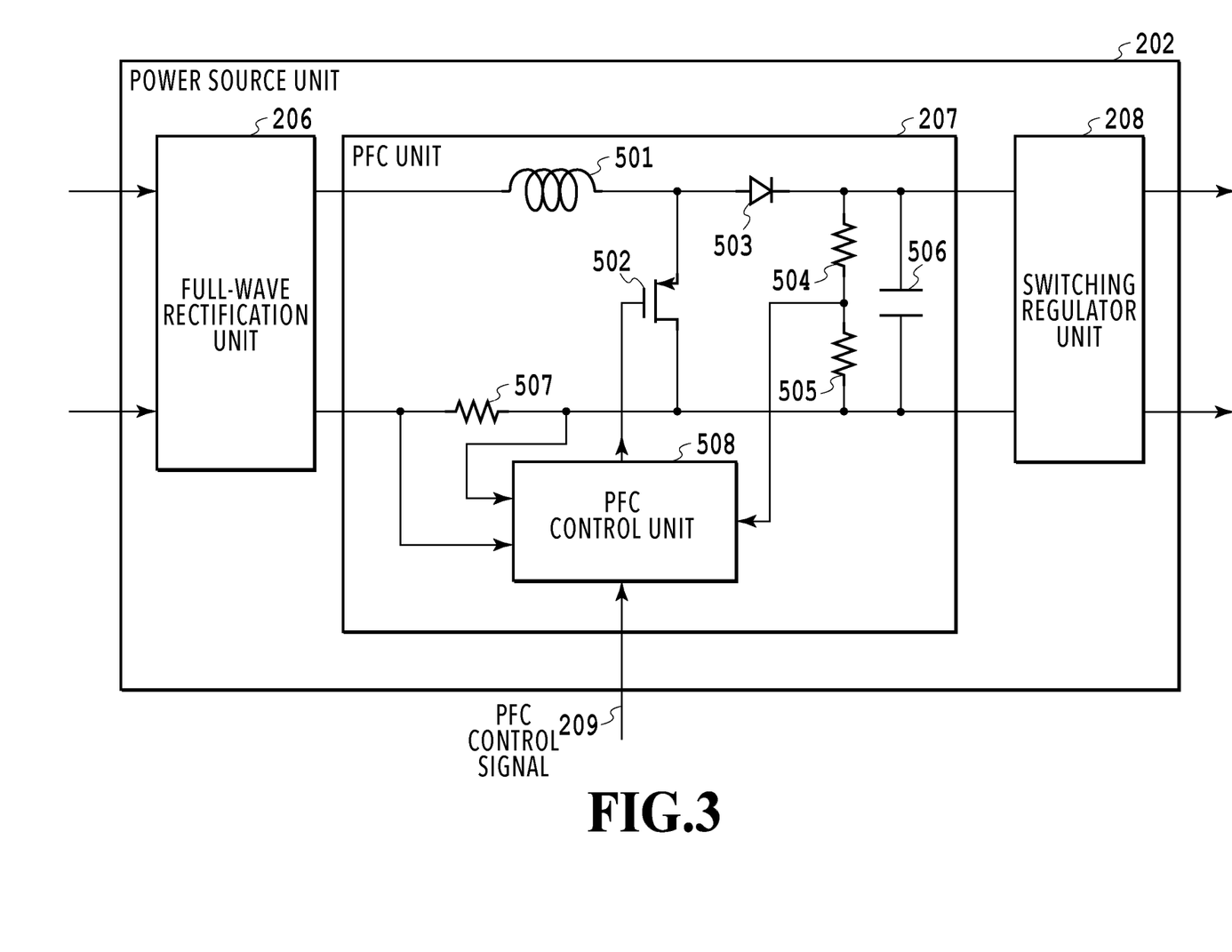
FIG. 3 is a block diagram showing a configuration of a power source unit.

Next, by using the configuration of the power source unit 202 in FIG. 3, the configuration of the PFC unit 207 is explained in detail. In the case where an alternating-current power source is input to the full-wave rectification unit 206, a rectified pulsating voltage waveform is output to the PFC unit 207.

In the case where the rectified pulsating voltage waveform is input to the PFC unit 207, a PFC control circuit 508 monitors the values of voltages divided by voltage dividing resistors 504 and 505 and the value of a current that flows through a resistor 507 and controls an FET 502 between on and off so that the current waveform synchronizes with the voltage waveform. FET stands for Field Effect Transistor.

Here, in the case where the FET 502 is controlled so as to turn on, power is stored in a choke coil 501 and in the case where the FET 502 is controlled so as to turn off, the power stored in the choke coil 501 is supplied to a primary smoothing capacitor 506 via a diode 503 and the current waveform is adjusted.

Further, as described above, to the PFC unit 207 (PFC control circuit 508), the PFC control signal 209 that controls the operation of the PFC unit 207 between on and off is input. Specifically, in the case where the PFC control signal 209 is controlled so as to be on by the power source control unit 201, it is possible for the PFC control circuit 508 to appropriately control the FET 502 to turn on or off. On the other hand, in the case where the PFC control signal 209 is controlled so as to be off by the power source control unit 201, it is not possible for the PFC control circuit 508 to control the FET 502 and the FET 502 is off at all times. Due to this, the operation in the PFC unit 207 is suspended and it is possible to reduce the power loss thereof.

Figure 4:
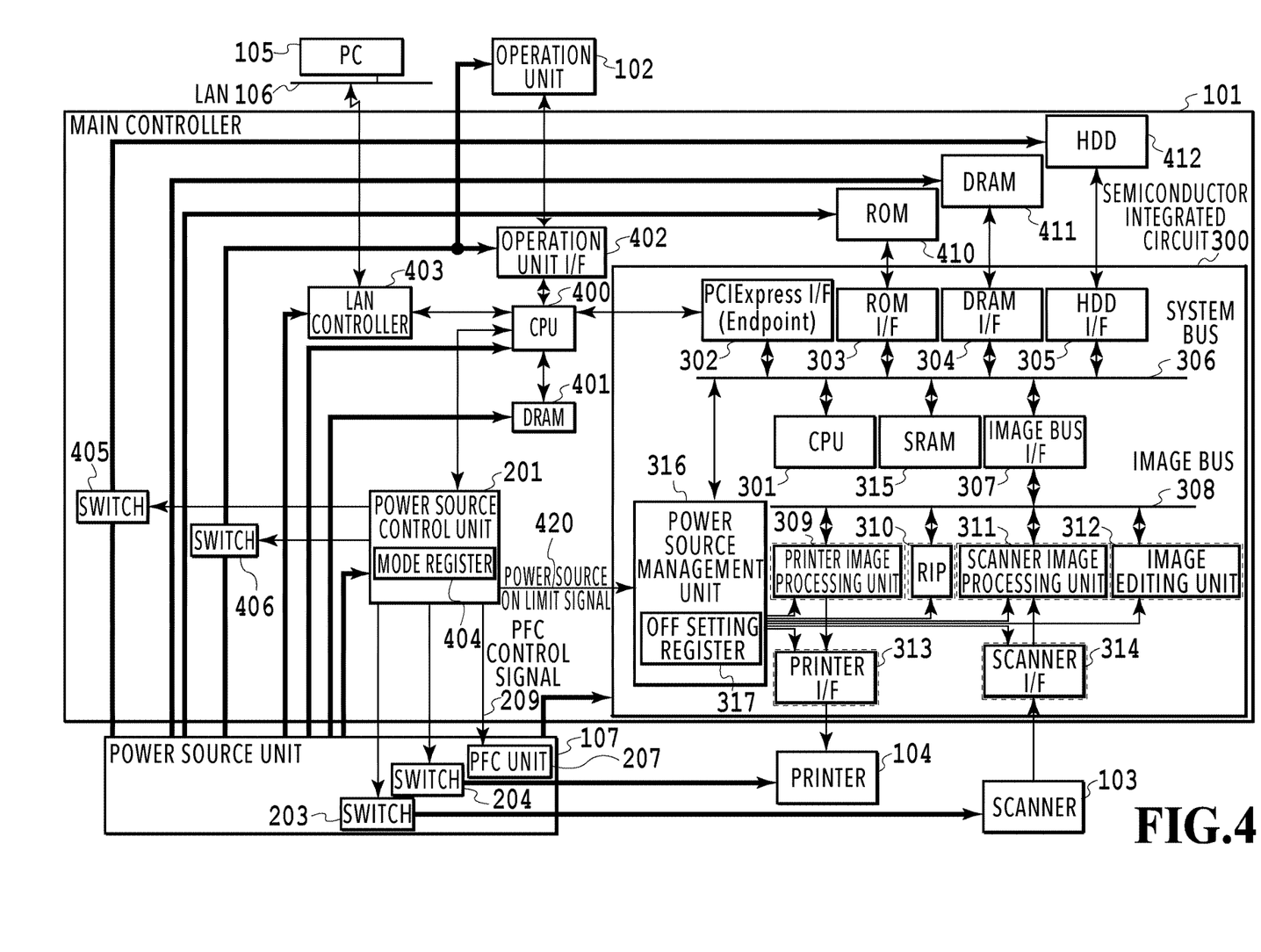
FIG. 4 is a block diagram showing a configuration of a main controller.

Next, by using FIG. 4, the control of the power source in the main controller 101 is explained in detail. FIG. 4 is a block diagram showing the configuration of the main controller 101. The main controller 101 includes a CPU 400, a DRAM 401, an operation unit I/F 402, a LAN controller 403, the power source control unit 201, the semiconductor integrated circuit 300, and a ROM 410, a DRAM 411, and an HDD 412 connected to the semiconductor integrated circuit 300. Further, the main controller 101 includes a switch 405 that controls the power source of the HDD 412 and a switch 406 that controls the power source of the operation unit 102 and the operation unit I/F 402.

The CPU (Central Processing Unit) 400 is a main control unit of the main controller 101 and operates in accordance with programs stored in the DRAM 401. Further, the CPU 400 includes an interface circuit with various peripheral devices. For example, the CPU 400 is compatible with the interface of the PCI Express standard and connected with the semiconductor integrated circuit 300 and the LAN controller 403 as Root Complex of the PCI Express bus. In the power-saving mode, it is also possible to cause the CPU 400 to operate at a clock frequency lower than the clock frequency in the normal mode. Further, due to this, it is possible to reduce the power consumption of the CPU 400 itself.

The DRAM (Dynamic Random Access Memory) 401 is used as a work memory of the CPU 400 in the case where the CPU 400 executes programs that control the entire image forming apparatus 100. The operation unit I/F 402 is an interface for connecting with the operation unit 102 and controls communication relating to operation information on the key, the touch panel, and so on of the operation unit 102, image data caused to be displayed by the operation unit 102, and so on. In the case where communication is no longer performed in the operation unit I/F unit 402 and the switch 406 is turned off by the control of the power source control unit 201, to be described later, the power source supplied to the operation unit I/F 402 and the operation unit 102 is shut off and the image forming apparatus 100 makes a transition into the power-saving mode.

The LAN controller 403 is an interface for connecting with the LAN 106 and performs control relating to a network, such as network connection, network communication, and so on, with an external device (in FIG. 4, PC 105) connected to the LAN 106. As described above, the switch 405 controls the power source of the HDD 412 between on and off and the switch 406 controls the power source of the operation unit 102 and the operation unit I/F 402 between on and off. As described above, the switches 405 and 406 are used, for example, for shutting off the power supplied from the power source unit 107 by the control of the power source control unit 201 at the time of causing the image forming apparatus 100 to make a transition into the power-saving mode.

The power source control unit 201 performs the control of the switches 203, 204, 405, and 406, the control of the PFC control signal 209, and the control of a power source on limit signal 420, to be described later, in accordance with the setting of a mode register 404 inside the power source control unit 201. The mode register 404 is a register for setting an operation power state of the image forming apparatus 100 for the power source control unit 201. In the present embodiment, as an example thereof, the operation power state of one of the normal mode and the power-saving mode is set as the operation power state that is set to the mode register 404.

Next, the internal configuration of the semiconductor integrated circuit 300 is explained in detail. A CPU 301 is a main control unit of the semiconductor integrated circuit 300 and performs real-time control of various function modules (printer image processing unit 309 to scanner I/F 314, to be described later) mounted on the semiconductor integrated circuit 300, and the like. The CPU 301 is connected, via a system bus 306, with a PCI Express I/F 302, a ROM I/F 303, a DRAM I/F 304, an HDD I/F 305, an image bus I/F 307, an SRAM 315, and a power source management unit 316.

The PCI Express I/F 302 is an interface of the PCI Express standard and performs transmission and reception of data with the CPU 400 by connecting with the CPU 400 of the main controller 101 with the semiconductor integrated circuit 300 as Endpoint. The ROM I/F 303 is an interface that connects with the ROM (Read Only Memory) 410 and performs reading of data for the ROM 410. The ROM 410 is a read only memory and stores a boot program for activating the system of the semiconductor integrated circuit 300, and in addition, predetermined execution programs and the like.

The DRAM I/F 304 is an interface that connects with the DRAM 411 and includes a memory controller for controlling the DRAM 411 and performs reading and writing of data for the DRAM 411. The DRAM 411 is a readable and writable memory and used as a work memory of the CPU 301 and for storing temporary setting values of the image forming apparatus 100, information on a job that is performed, and so on. The DRAM 411 makes a transition into a self refresh state in the power-saving mode and stores data in a low power consumption state.

The HDD I/F 305 is a high-speed interface that connects with the HDD 412 and as an example thereof, the interface of the Serial ATA (Advanced Technology Attachment) standard is used. The HDD (Hard Disk Drive) 412 is a non-volatile storage device and used as a storage of the OS (Operating System) of the image forming apparatus 100 and further, is used to temporarily or permanently store large-capacity image data. In the case where the state where there is no access to the HDD 412 is brought about and the switch 405 is turned off by the control of the power source control unit 201, the power source that is supplied to the HDD 412 is shut off and the image forming apparatus 100 makes a transition into the power-saving mode.

The SRAM (Static Random Access Memory) 315 is a small-scale memory incorporated in the semiconductor integrated circuit 300. In the power-saving mode, the SRAM 315 is used as a work memory of the CPU 301 in place of the DRAM 411 having made a transition into the self refresh state. The image bus I/F 307 is an interface that connects the system bus 306 and an image bus 308 for transferring image data at a high speed and operates as a bus bridge that converts a data structure.

Following the above, various function modules mounted on the semiconductor integrated circuit 300 are explained in detail. On the semiconductor integrated circuit 300, a plurality of function modules is mounted, such as the printer image processing unit 309, a RIP 310, a scanner image processing unit 311, an image editing unit 312, a printer I/F 313, and the scanner I/F 314, and these modules are connected to one another via the image bus 308.

The printer image processing unit 309 performs image processing, such as color conversion, filter processing, and resolution conversion, for print output image data that is output to the printer 104. The RIP (Raster Image Processor) 310 develops PDL (Page Description Language) data transmitted as a print job from the PC 105 into a raster image, such as a bitmap image.

The scanner image processing unit 311 performs image processing, such as correction, processing, and editing, for image data (input image data) read by the scanner 103. The image editing unit 312 performs various kinds of editing processing of image data, such as rotation of image data. The printer I/F 313 is an interface that connects with the printer 104 and performs conversion in a synchronous/asynchronous system of image data. The scanner I/F 314 is an interface that connects with the scanner 103 and performs conversion of the image data format for the image data read by the scanner 103, and the like.

As above, the configuration of the main controller 101 is explained and next, the control of the power source in the main controller 101 is explained. As described above, in the power-saving mode of the image forming apparatus 100, in the state where the PFC unit 207 is turned off, the upper limit of power that can be supplied in the power source unit 202 is set (limited) to a value lower than the upper limit of power that can be supplied in the normal mode. Because of this, in the power-saving mode of the image forming apparatus 100, it is also necessary to reduce the power consumption of the semiconductor integrated circuit 300 so that the power that can be supplied in the power source unit 202 is suppressed to within an upper limit lower than the upper limit of power that can be supplied in the normal mode.

Consequently, in the semiconductor integrated circuit 300, by performing control of the power source (by turning off the power source) of the power source domain (power source area) of the semiconductor integrated circuit 300 for each function module, the power consumption in the semiconductor integrated circuit 300 is reduced. Specifically, the power source domain whose power source is separated from another is configured for each of the printer image processing unit 309, the RIP 310, the scanner image processing unit 311, the image editing unit 312, the printer I/F 313, and the scanner I/F 314, and the power source is managed for each power source domain.

Then, regarding those power source domains whose power source can be controlled (power source domains whose power source can be turned off), the power source is physically controlled (shut off) by the power source management unit 316 mounted on the semiconductor integrated circuit 300. In the case where there is a command from the CPU 301 or in the case where mainly the CPU 301 is in the heavy load state, the power source management unit 316 controls (manages) the power source of the power source domain based on the power source on limit signal 420 transmitted from the power source control unit 201. That is, the power source control unit 201 outside the semiconductor integrated circuit 300 controls the power source of the power source domain inside the semiconductor integrated circuit 300 by the power source on limit signal 420.

The power source on limit signal 420 is a one-bit electric signal and is electrically controlled into one of a high-level logic state and a low-level logic state by the power source control unit 201. Further, regarding the high-level or low-level logic state of the power source on limit signal 420, one is set so as to permit the state where the power source of the power source domain is on and the other is set so as to shut off the power source by limiting the state where the power source of the power source domain is on. Consequently, for example, in the case where the power source on limit signal 420 is at the high level, the power source management unit 316 performs control so as to permit the power source of the power source domain inside the semiconductor integrated circuit 300 to be in the on state. On the other hand, in the case where the power source on limit signal 420 is at the low level, the power source management unit 316 performs control so as to shut off the power source by limiting the state where the power source of the power source domain inside the semiconductor integrated circuit 300 is on.

As described above, by controlling the power source of the power source domain inside the semiconductor integrated circuit 300 by the power source control unit 201 outside the semiconductor integrated circuit 300, it is possible to control the power source of the power source domain both independently and preferentially for the CPU 301 inside the semiconductor integrated circuit 300. Further, it is possible for the power source control unit 201 to reduce the power consumption of the semiconductor integrated circuit 300 by controlling the power source of the power source domain inside the semiconductor integrated circuit 300 into the off state.

In addition, the power source management unit 316 includes an off setting register 317. The off setting register 317 corresponds to a control target holding unit and in the case where the power source on limit signal 420 is controlled so as to shut off the power source, the off setting register 317 stores the power source domain set as a target whose power source is shut off as information. In the off setting register 317, whether or not the unit is taken to be a target whose power source is shut off is set as information for each power source domain of the printer image processing unit 309, the RIP 310, the scanner image processing unit 311, the image editing unit 312, the printer I/F 313, and the scanner I/F 314.

Further, the setting of a power source domain that is taken to be a target whose power source is shut off to the off setting register 317 is performed by the CPU 301 of the semiconductor integrated circuit 300 based on the information (setting value) stored in the ROM 410 during initialization processing at the time of activation of the semiconductor integrated circuit 300. As a supplement, the power source domain that is taken to be a target whose power source is shut off is selected in accordance with whether or not it is possible to reduce the power consumption of the semiconductor integrated circuit 300 so that the power consumption of the image forming apparatus 100 is suppressed to within the upper limit of the power consumption in the power-saving mode.

In the semiconductor integrated circuit 300, the power source domains other than the power source domain set as a target whose power source is shut off enter the state where the power source is on at all times by the power supplied from the power source unit 107. Further, in order to prevent the uncertainty of output from the power source domain whose power source is turned off from propagating, an isolator cell is arranged for the output signal.

<Operation Mode Transition Flow of Image Forming Apparatus>

Figure 5A:
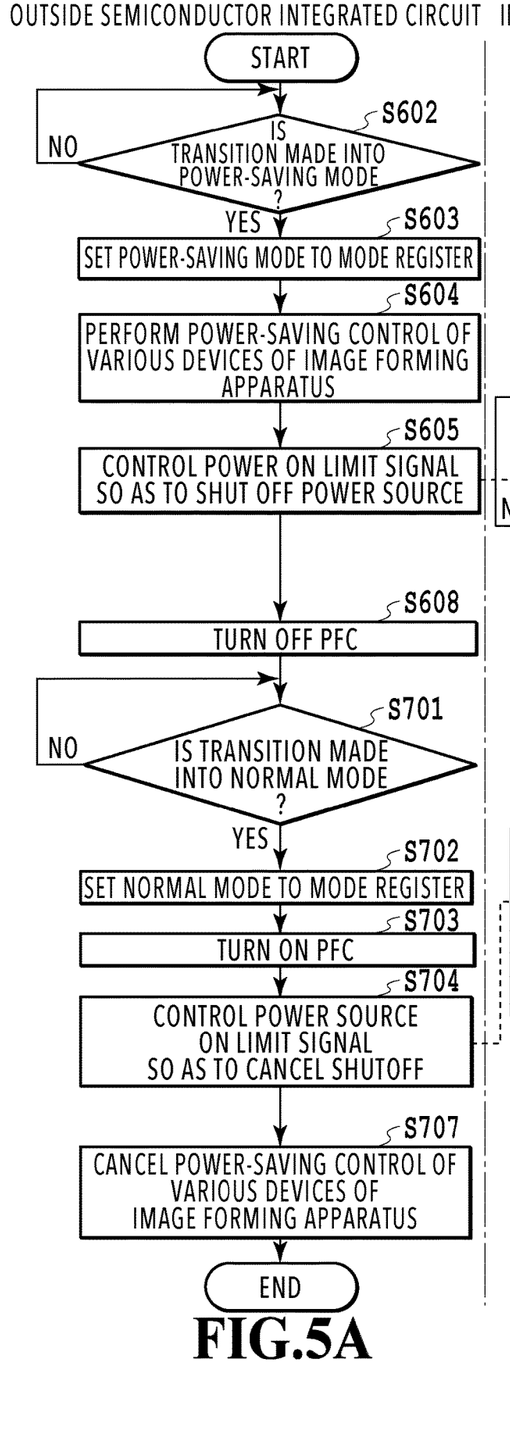
FIG. 5A is a flowchart showing a procedure of transition processing of an operation mode outside a semiconductor integrated circuit of the image forming apparatus.
Figure 5B:
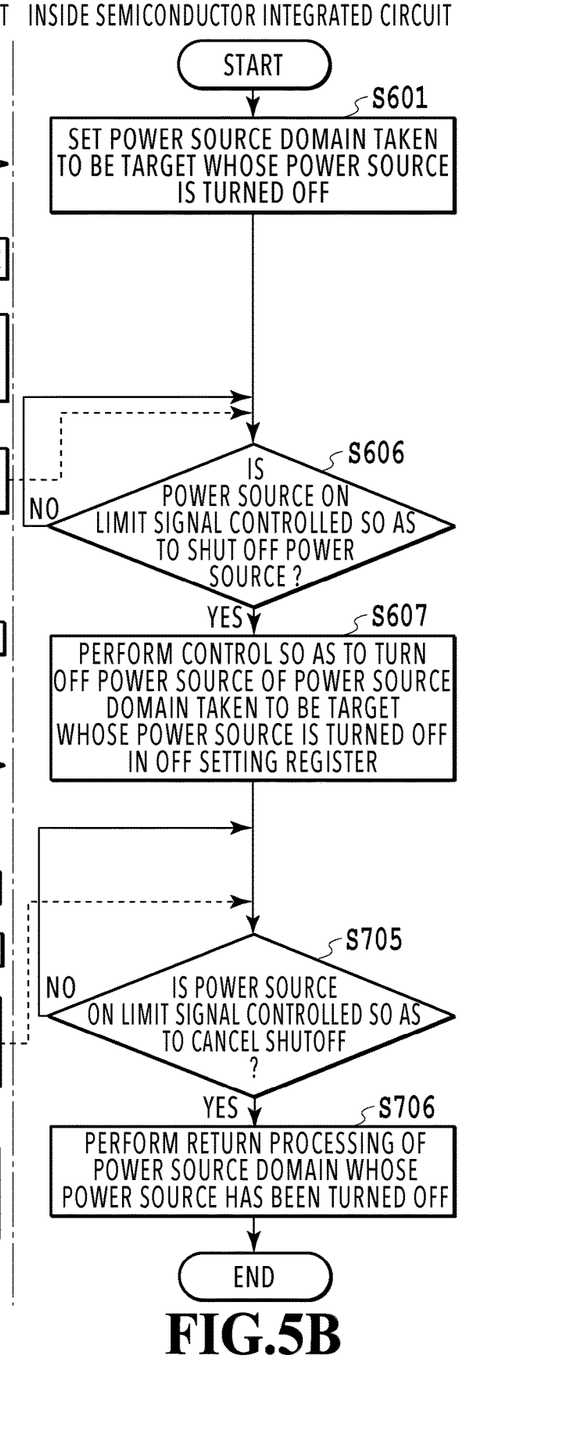
FIG. 5B is a flowchart showing a procedure of transition processing of an operation mode inside the semiconductor integrated circuit of the image forming apparatus.

FIG. 5A and FIG. 5B are a flowchart showing a procedure of transition processing of an operation mode of the image forming apparatus 100 according to the present embodiment. In the normal operation, the power source of the power source domain inside the semiconductor integrated circuit 300 is controlled by the CPU 301, and in FIG. 5A and FIG. 5B, the case where a heavy load is applied to the CPU 301 in the process to perform processing and it is no longer possible for the CPU 301 to perform control is shown as an example thereof.

The processing shown in FIG. 5A is performed by the CPU 400 of the main controller 101 and the power source control unit 201 having received a command from the CPU 400. The processing shown in FIG. 5B is performed by the power source management unit 316 based the information stored in the off setting register 317 of the semiconductor integrated circuit 300 (that is, information on the setting of the power source domain that is taken to be a target whose power source is shut off) and the power source on limit signal 420.

In the case where the power source is turned on in the image forming apparatus 100 (semiconductor integrated circuit 300), the CPU 301 sets the setting value stored in advance in the ROM 410 to the off setting register 317 as the initialization processing in the semiconductor integrated circuit 300 (S601). The setting value refers to information on the power source domain that is set as a target whose power source is shut off in the power-saving mode as described above.

After the image forming apparatus 100 is activated (that is, after a transition is made into the normal mode in which it is possible to perform a job), the CPU 400 determines whether or not a condition that causes a transition to be made into the power-saving mode, such as an idle state, has occurred (S602). In the case of determining that a condition that causes a transition to be made into the power-saving mode has occurred (S602 Yes), the CPU 400 causes the processing to advance to step S603 in order to cause the image forming apparatus 100 to make a transition into the power-saving mode.

At step S603, the CPU 400 performs the setting of the power-saving mode to the mode register 404. In the case where the setting of the power-saving mode is performed to the mode register 404, the power source control unit 201 performs power source control of various devices in order to reduce the power consumption of the image forming apparatus 100 based on the setting (S604).

As the power source control here, for example, the power source control unit 201 shuts off the power source supplied to the HDD 412 that is not accessed in the power-saving mode by turning off the switch 405. Further, the power source control unit 201 shuts off the power source supplied to the operation unit 102 and the operation unit I/F 402 that are not used in the power-saving mode by turning off the switch 406. In addition, the power source control unit 201 shuts off the power source supplied to the scanner 103 that is not used in the power-saving mode by turning off the switch 203, and the power source supplied to the printer 104 that is not used in the power-saving mode by turning off the switch 204.

In addition, at the time of causing a transition to be made into the power-saving mode, the CPU 400 notifies the CPU 301 of the semiconductor integrated circuit 300 that a transition is made into the power-saving mode and further, in order to reduce the power consumption of the CPU 400 itself, the CPU 400 reduces the clock frequency at which the CPU 400 is caused to operate. In FIG. 5A and FIG. 5B, it is assumed that a heavy load is applied to the CPU 301 at this point in time, but in the case where the CPU 301 is operating normally, the CPU 301 performs control so as to turn off the power source of the power source domain based on the notification. Further, the CPU 301 causes the operation to advance from the execution program stored in the DRAM 411 to a standby program in the power-saving mode stored in the SRAM 315 and reduces the power consumption by bringing the DRAM 411 into the self refresh state.

The power source control unit 201 controls the power source on limit signal 420 for the power source management unit 316 in order to limit the power source on state of the power source domain of the semiconductor integrated circuit 300 and to shut off the power source before turning off the PFC unit 207 of the power source unit 107 (S605). The power source management unit 316 determines whether the power source on limit signal 420 that is transmitted from the power source control unit 201 is a signal of the logic that shuts off the power source of the power source domain of the semiconductor integrated circuit 300 (S606).

Then, in the case of determining that the power source on limit signal 420 is a signal of the logic that shuts off the power source of the power source domain, the power source management unit 316 sequentially performs control to turn off the power source of the power source domain based on the setting value of the off setting register 317, which is set at step S601 (S607). At step S607, in the case where the power source of the power source domain set so that the power source thereof is turned off is in the on state, the power source management unit 316 performs control to turn off the power source for the power source domain as a target and in the case where the power source domain is in the off state, the power source management unit 316 does not perform control to turn off the power source. For example, in the case where the power source domains set to the off setting register 317 as a target whose power source is turned off are those of the printer image processing unit 309, the scanner image processing unit 311, and the scanner I/F 314 and the power sources of those power source domains are in the on state, the power sources are turned off sequentially.

After controlling the power source of the power source domain into the off state, the power source control unit 201 causes a transition to be made into the power-saving mode by controlling the PFC control signal 209 to turn off the PFC unit 207 of the power source unit 107 (S608). The processing at step S608 is the last processing of the sequence to cause the image forming apparatus 100 to make a transition into the power-saving mode.

Next, the processing to make a transition from the power-saving mode into the normal mode is explained. In the power-saving mode, the CPU 400 determines whether or not a condition that causes the mode to return to the normal mode (that causes a transition to be made into the normal mode) has occurred (S701). For example, in the case where the image forming apparatus 100 receives a print job transmitted from the PC 105 connected to the LAN 106, the CPU 400 starts causing the image forming apparatus 100 to return to the normal mode in order to perform the print job and causes the processing to advance to step S702.

At step S702, the CPU 400 performs the setting of the normal mode to the mode register 404 at the time of causing the image forming apparatus 100 to return to the normal mode. Next, the power source control unit 201 returns the upper limit to the original upper limit so as to increase the upper limit of power that can be supplied in the power source unit 202 by controlling the PFC control signal 209 to turn on the PFC unit 207 of the power source unit 107 (S703).

After turning on the PFC unit 207, the power source control unit 201 controls the power source on limit signal 420 for the power source management unit 316 in order to cancel the control to keep the power source of the power source domain in the off state (that is, in order to cancel the shutoff) (S704). The power source management unit 316 determines whether or not the power source on limit signal 420 transmitted from the power source control unit 201 is a signal of the logic that cancels the shutoff of the power source of the power source domain of the semiconductor integrated circuit 300 (S705).

Then, in the case of determining that the power source on limit signal 420 is a signal of the logic that cancels the shutoff of the power source of the power source domain, the power source management unit 316 cancels the shutoff of the power source of the power source domain whose power source has been turned off based on the setting value of the off setting register 317 (that is, performs return control) (S706). For example, in the case where the power source domains whose power source has been controlled so as to be turned off at step S607 are those of the printer image processing unit 309, the printer I/F 313, the scanner image processing unit 311, and the scanner I/F 314, the power source management unit 316 performs control so as to sequentially turn on the power sources of those power source domains.

In the case of being controlled so as to cancel the shutoff of the power source of the power source domain by the power source control unit 201, the CPU 400 notifies the CPU 301 of the semiconductor integrated circuit 300 of the return to the normal mode and returns the clock frequency having been reduced to the normal clock frequency. In the case where the CPU 301 is operating normally at this point in time, the CPU 301 cancels the self refresh state of the DRAM 411. Then, the CPU 301 causes the operation to advance from the operation of the standby program in the power-saving mode, which is stored in the SRAM 315, to the operation of the execution program in the normal mode, which is stored in the DRAM 411.

Further, the power source control unit 201 performs power source control of various devices so that it is made possible to perform a job, such as copy, print, and scan, in the image forming apparatus 100 based on the setting of the normal mode of the mode register 404 (S707). As the power source control here, for example, the power source control unit 201 turns on the switch 405 and supplies the power source to the HDD 412 so as to be capable of accessing the HDD 412. Further, the power source control unit 201 turns on the switch 406 and supplies the power source to the operation unit 102 and the operation unit I/F 402 in order to bring about a state where a user can perform the operation. In addition, the power source control unit 201 turns on the switch 203 and supplies the power source to the scanner 103 in order to bring about a state where scan processing can be performed and turns on the switch 204 and supplies the power source to the printer 104 in order to bring about a state where printer processing can be performed. As described above, the image forming apparatus 100 completes a transition into the normal mode by cancelling the power-saving control of various devices to bring about a state where a job can be performed.

As described above, at the time of causing the operation mode of the image forming apparatus 100 to make a transition, in accordance with the change in the upper limit of power that can be supplied in the case where the PFC unit 207 is turned on or off, the power source of the power source domain of the semiconductor integrated circuit 300 is controlled by the power source control unit 201. Specifically, at the time of making a transition into the power-saving mode, control is performed by the power source control unit 201 outside the semiconductor integrated circuit 300 so as to turn off the power source of the power source domain so that the power that is supplied is suppressed to within the upper limit of power that can be supplied in the case where the PFC unit 207 is turned off. Then, by performing control in this manner, irrespective of whether or not the power source control of the power source domain of the semiconductor integrated circuit 300 by the CPU 301 is possible, it is possible to reduce the power consumption of the semiconductor integrated circuit 300 by shutting off the power source of the power source domain of the semiconductor integrated circuit 300.

In addition, at the time of making a transition from the power-saving mode into the normal mode, the power source management unit 316 performs control of the power source of the power source domain set as a target whose power source is shut off by giving priority to the power source on limit signal 420 over the control by the CPU 301. That is, in this case, the power source management unit 316 performs control so as to shut off the power source domain even though the CPU 301 tries to perform control so as to turn on the power source of the power source domain provided that the power source on limit signal 420 is controlled so as to shut off the power source of the power source domain.

The reason the control is performed in this manner is that there is a possibility that the CPU 301 performs control so as to turn on the power source of the power source domain before the PFC unit 207 is turned on also in a case other than the case where the CPU 301 is in the heavy load state (that is, a case of the normal operation). Specifically, a case where the control from the power source control unit 201 to the PFC unit 207 is delayed for some reason corresponds to this case. Further, in this case, in addition to performing control by giving priority to the power source on limit signal 420 (or in combination with performing control by giving priority to the power source on limit signal 420), it may also be possible to delay the return control of the CPU 301 by a predetermined time in order to guarantee the operation in the power source unit.

Second Embodiment

As described above, in the case where the PFC unit is turned off in the power-saving mode, the upper limit of power that the power source unit can supply to the main controller is limited. Because of this, in the first embodiment, the configuration is such that the power source of the power source domain inside the semiconductor integrated circuit is shut off by controlling the power source on limit signal from the power source control unit outside the semiconductor integrated circuit. In contrast to this, in a second embodiment, a configuration is such that control is performed so that the PFC unit is kept in the on state also in the power-saving mode in the case of a situation in which the power consumption in the semiconductor integrated circuit is high, that is, a situation in which the power source domain inside the semiconductor integrated circuit is on. Specifically, the configuration is such that the power source management unit inside the semiconductor integrated circuit notifies the power source control unit outside the semiconductor integrated circuit of information relating to on/off of the power source of the power source domain inside the semiconductor integrated circuit and based on the information, the PFC unit is controlled.

By adopting the above-described configuration in the second embodiment, it is possible to avoid a situation in which the PFC unit 207 is turned off in the power-saving mode and power exceeding the upper limit of power that can be supplied, which is permitted in the state where the PFC unit 207 is turned off, is supplied (consumed). In the following, the second embodiment is explained in detail by using FIG. 6, FIG. 7A, and FIG. 7B. The configuration of the main controller of the second embodiment is that same as the configuration of the main controller of the first embodiment, and therefore, in the second embodiment, differences from the first embodiment are explained mainly.

Figure 6:
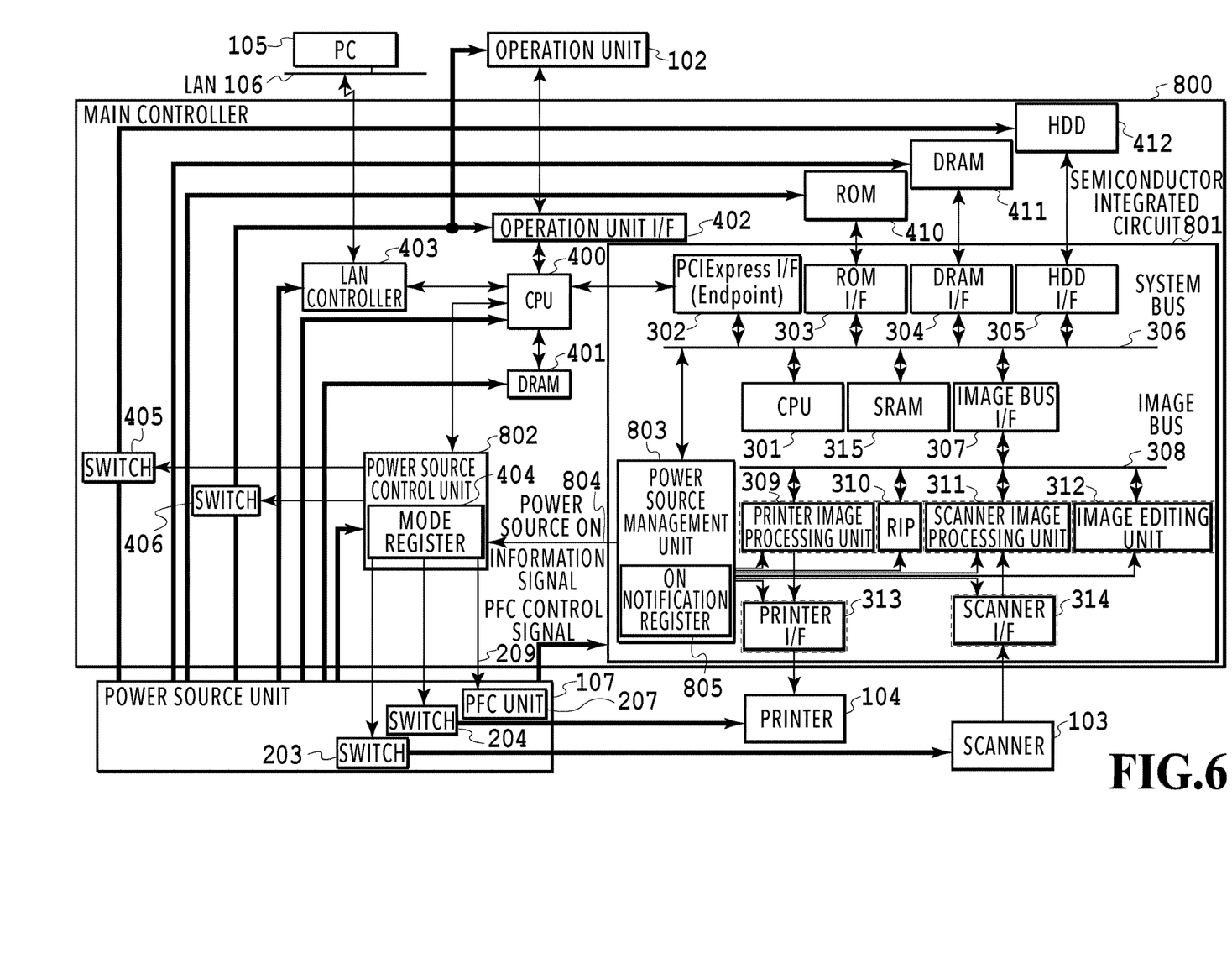
FIG. 6 is a block diagram showing a configuration of a main controller.

FIG. 6 is a block diagram showing a configuration of a main controller 800 and by using FIG. 6, the control of the power source in the main controller 800 is explained in detail. In the main controller 800, a power source management unit 803 of a semiconductor integrated circuit 801 manages and controls the power source of a power source domain of the semiconductor integrated circuit 801 based on a command from the CPU 301 in the normal operation.

The power source management unit 803 includes an on notification register 805 and the on notification register 805 is used for setting a notification-target power source domain as information at the time of notifying a power source control unit 802 of the main controller 800 of the power source state of the power source domain. In more detail, in the case where the power source of any one of the power source domains set to the on notification register 805 is in the on state, the power source control unit 802 is notified of this by a power source on information signal 804. In the on notification register 805, the power source domain taken to be a target whose power source state is notified is set by the CPU 301 based on the setting value stored in the ROM 410 during initialization processing at the time of activation of the semiconductor integrated circuit 801.

As described above, the power source on information signal 804 is a signal for the power source management unit 803 to notify the power source control unit 802 of the power source state of the power source domain inside the semiconductor integrated circuit 801. The power source on information signal 804 is a one-bit electric signal and controlled electrically to one of a high-level logic state and a low-level logic state by the power source management unit 803.

Regarding the high-level or the low-level logic state of the power source on information signal 804, at least one is set so as to indicate that the power source of any one of the power source domains set to the on notification register 805 as a notification target is in the on state. Consequently, for example, in the case where the power source on information signal 804 is at the high level, the power source control unit 802 is notified that the power source of any one of the power source domains set to the on notification register 805 as a notification target is in the on state. On the other hand, in the case where the power source on information signal 804 is at the low level, the power source control unit 802 is notified that the power source of each of the power source domains set to the on notification register 805 as a notification target is in the off state.

The power source control unit 802 determines whether or not to keep the PFC unit 207 in the on state in accordance with whether the power source on information signal 804 is at the high level or at the low level (that is, in accordance with the power consumption of the semiconductor integrated circuit 801). That is, in the case where the power source of the power source domain is in the on state, at the time of making a transition into the power-saving mode, the PFC unit 207 is controlled so as not to be turned off so that the power consumption of the image forming apparatus 100 is suppressed to within the upper limit of power that can be supplied, which is permitted in the state where the PFC unit 207 is turned on. As a supplement, the power source domain whose power source state is notified is selected in accordance with whether or not it is possible to suppress the power consumption of the image forming apparatus 100 to within the upper limit of supplied power permitted in the case where the PFC unit 207 is turned off on a condition that at least the power source of the power source domain is in the on state.

<Operation Mode Transition Flow of Image Forming Apparatus>

Figure 7A:
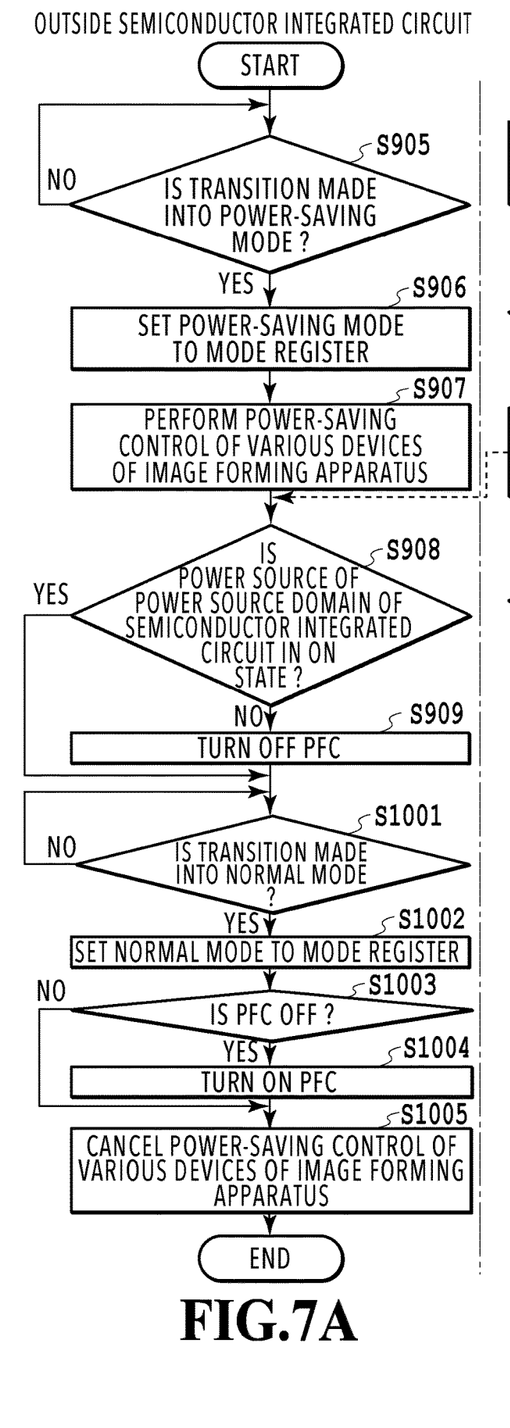
FIG. 7A is a flowchart showing a procedure of transition processing of an operation mode outside a semiconductor integrated circuit of an image forming apparatus.
Figure 7B:
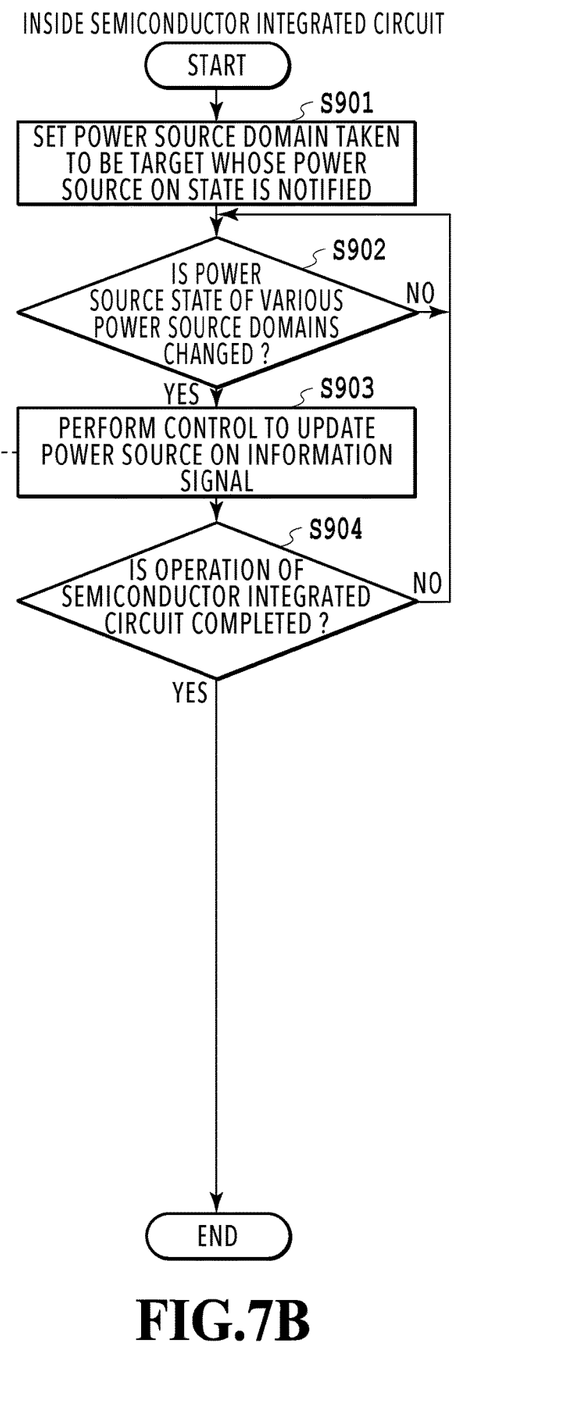
FIG. 7B is a flowchart showing a procedure of transition processing of an operation mode inside the semiconductor integrated circuit of the image forming apparatus.

FIG. 7A and FIG. 7B are a flowchart showing a procedure of transition processing of an operation mode of the image forming apparatus 100 according to the present embodiment. The processing shown in FIG. 7A is performed in accordance with a power source control program of the DRAM 401 and performed by the CPU 400 of the main controller 800 and the power source control unit 802 having received a command from the CPU 400. The processing shown in FIG. 7B is performed mainly by the power source management unit 803 based on information stored in the on notification register 805 of the semiconductor integrated circuit 801 (that is, information relating to the setting of the power source domain taken to be a target whose power source state is notified).

In the case where the power source is turned on in the image forming apparatus 100 (semiconductor integrated circuit 801), the CPU 301 sets the setting value stored in advance in the ROM 410 to the on notification register 805 as the initialization processing in the semiconductor integrated circuit 801 (S901). As described above, the setting value refers to information relating to the power source domain taken to be a target whose power source state is notified.

After the image forming apparatus 100 is activated (that is, a transition is made into the normal mode), the power source management unit 803 determines whether or not the power source state of the power source domain set as a target whose power source state is notified is changed (S902).

In the case of determining that the power source state is changed (S902 Yes), the power source management unit 803 controls the power source on information signal 804 based on the changed power source state (S903). In detail, in the case where the state where the power sources of all the power source domains set as a target whose power source state is notified are off is changed into the state where the power source of at least one of the power source domains is on, the power source management unit 803 performs control to update the power source on information signal 804. Further, in the case where the state where the power source of at least one of the power source domains set as a target whose power source state is notified is on is changed into the state the power sources of all the power source domains are off, the power source management unit 803 performs control to update the power source on information signal 804.

For example, it is assumed that the power source domains set to the on notification register 805 are the power source domains of the printer image processing unit 309, the RIP 310, and the scanner image processing unit 311. In this setting, in the case where the power source domains of the printer image processing unit 309, the RIP 310, and the scanner image processing unit 311 change from the state where the power sources are off into the state where the power sources are on, the power source management unit 803 performs control to update the power source on information signal 804. That is, the power source management unit 803 notifies the power source control unit 802 that the power source of at least one of the power source domains set as a notification target is changed into the on state.

Further, even in the case where only the power source of the power source domain of the RIP 310 is turned off from the state where all the power sources are on in the power source domains of the printer image processing unit 309, the RIP 310, and the scanner image processing unit 311, the power source management unit 803 does not perform control to update the power source on information signal 804. Then, in the case where the power sources of the power source domains are turned off in the power source domains of the printer image processing unit 309 and the scanner image processing unit 311, the power source management unit 803 performs control to update the power source on information signal 804. That is, the power source management unit 803 notifies the power source control unit 802 that the power sources are changed into the off state in all the power source domains set as a notification target.

The power source management unit 803 repeatedly performs the processing at steps S902 and S903 while power is supplied to the semiconductor integrated circuit 801 (while the semiconductor integrated circuit 801 is in operation) (S904). That is, the power source management unit 803 repeatedly controls the power source on information signal 804 in accordance with the change in the state of the power sources of the power source domains set as a notification target.

Further, the CPU 400 of the main controller 800 determines whether a condition that causes a transition to be made into the power-saving mode, such as the idle state, has occurred after activation (that is, after a transition into the normal mode is made) (S905). In the case of determining that a condition that causes a transition to be made into the power-saving mode has occurred (S905 Yes), the CPU 400 causes the processing to advance to step S906 in order to cause the image forming apparatus 100 to make a transition into the power-saving mode.

At step S906, the CPU 400 performs the setting of the power-saving mode to the mode register 404. In the case where the setting of the power-saving mode is performed to the mode register 404, the power source control unit 802 performs power source control of various devices in order to reduce the power consumption of the image forming apparatus 100 based on the setting (S907).

Next, the power source control unit 802 determines whether or not the power source of any of the power source domains set as a target whose power source state is notified is in the on state based on the power source on information signal 804 controlled by repeatedly performing steps 902 and S903 (S908).

In the case where the results of the determination determine that the power source of any of the power source domains set as a target whose power source state is notified is in the on state (S908 Yes), the power source control unit 802 causes a transition to be made into the power-saving mode without turning off the PFC unit 207. The reason is that, as described above, in relation to the power consumption in the semiconductor integrated circuit 801, the supplied power becomes larger than the upper limit of power that can be supplied, which is permitted in the state where the PFC unit 207 is off, and therefore, it is not appropriate to turn off the PFC unit 207.

On the other hand, in the case where it is determined that the power sources of all the power source domains set as a target whose power source state is notified are in the off state (S908 No), the power source control unit 802 causes the processing to advance to step S909 and turns off the PFC unit 207 by the PFC control signal 209. The processing at step S908 or S909 is the last processing of the sequence causing the image forming apparatus 100 to make a transition into the power-saving mode.

Next, the processing to make a transition from the power-saving mode into the normal mode is explained. In the power-saving mode, the CPU 400 determines whether or not a condition that causes the mode to return to the normal mode (that causes a transition to be made into the normal mode) has occurred (S1001). In the case where the results of the determination determine that a condition that causes the mode to return to the normal mode has occurred (S1001 Yes), the CPU 400 starts causing the image forming apparatus 100 to return to the normal mode and causes the processing to advance to step S1002.

At step S1002, the CPU 400 performs the setting of the normal mode to the mode register 404 at the time of causing the image forming apparatus 100 to return to the normal mode. Next, the power source control unit 802 determines whether or not the PFC unit 207 of the power source unit 107 is in the off state (S1003).

Then, in the case of determining that the PFC unit 207 is in the off state (S1003 Yes), the power source control unit 802 turns on the PFC unit 207 of the power source unit 107 by controlling the PFC control signal 209 (S1004). Due to this, the upper limit is returned to the original upper limit so as to increase the upper limit of power supplied to the power source unit 202. On the other hand, in the case of determining that the PFC unit 207 is in the on state (S1003 No), the power source control unit 802 causes the processing to advance to step S1005.

At step S1005, the power source control unit 802 performs power source control of various devices so that it is made possible to perform a job in the image forming apparatus 100 based on the setting of the normal mode of the mode register 404. As described above, by cancelling the power-saving control of various devices and bringing about a state where a job can be performed, the image forming apparatus 100 completes the transition into the normal mode.

As described above, it is possible for the power source control unit 802 to control the power source of the PFC unit 207 of the power source unit 107 in accordance with the state of power consumption thereof also in the power-saving mode by grasping the state of power consumption of the semiconductor integrated circuit 801 by the power source on information signal 804. That is, it is possible to avoid a situation in which the PFC unit 207 is turned off in the power-saving mode and power exceeding the upper limit of power that can be supplied, which is permitted in the state where the PFC unit 207 is turned off, is supplied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, it is of course possible to combine the above-described method with the method of controlling the power source of the power source domain of the semiconductor integrated circuit. Consequently, for example, it is also possible to combine the first embodiment and the second embodiment. That is, it is also possible for the power source control unit to control the power source inside the semiconductor integrated circuit by the power source on limit signal based on the power source on information signal.

In addition, in the above-described embodiment, the case where the electronic device is the image forming apparatus is explained as an example thereof, but it is possible to apply the present invention to any electronic device having a PFC circuit in the power source unit and further mounting a semiconductor integrated circuit by performing control similarly.

According to the present invention, on the premise that the power consumption of an electronic device, such as an image forming apparatus on which a semiconductor integrated circuit is mounted, is suppressed to within the upper limit of supplied power that is permitted in the power source unit including a PFC circuit, it is possible to reduce the power consumption irrespective of whether or not the control of the power source from inside the semiconductor integrated circuit is possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198395, filed Oct. 12, 2017, which is hereby incorporated by reference wherein in its entirety.

What is claimed is:

1. An image forming apparatus comprising:
a power source unit having a PFC (Power Factor Correction) circuit;
a semiconductor integrated circuit including at least one module for performing image processing; and
a first power source control device that controls whether to turn on or to turn off the PFC circuit, and controls a power control signal input into the semiconductor integrated circuit so that the PFC circuit is on while the power of the module in the semiconductor integrated circuit is on.

2. The image forming apparatus according to claim 1, wherein the first power source control device controls whether to turn on or to turn off the PFC circuit and the power control signal so as to turn off a power of the module before turning off the PFC circuit and to cancel the turn-off of the power of the module after turning on the PFC circuit.

3. The image forming apparatus according to claim 1, wherein the image forming apparatus is operable at least in a first power state and a second power state in which power consumption is less than the first power state, and
the first power source control device performs the control so as to turn on, based on a detection of an event to shift the image forming apparatus from the second power state into the first power state, the PFC circuit before turning on the power of the module.

4. The image forming apparatus according to claim 3, wherein the first power source control device performs the control so as to turn off, based on a detection of another event to shift the image forming apparatus from the first power state into the second power state, the PFC circuit after turning off the power of the module.

5. The image forming apparatus according to claim 1, wherein:
the semiconductor integrated circuit has a power source management device configured to manage a power state of the module,
the power source management device notifies the first power source control device of the power state of the module by a power information signal connected with the first power source control unit, and
the first power source control device performs, in a case where the notified power state of the module is on, control so as not to turn off the PFC circuit.

6. The image forming apparatus according to claim 1, wherein the semiconductor integrated circuit further has:
a first control device configured to control the semiconductor integrated circuit; and
a second power source control device configured to control the power of the module based on the power control signal from the first power source control device and a command of the first control device, and
the second power source control device controls, in a case where at least the PFC circuit is off, the power of the module by giving priority to the power control signal from the first power source control device over the command of the first control device.

7. The image forming apparatus according to claim 6, wherein:
the semiconductor integrated circuit mounts the modules in plurality, and
the second power source control device controls the power for each plurality of the modules.

8. The image forming apparatus according to claim 7, wherein:
the semiconductor integrated circuit further has a control target holding unit configured to hold a module that is a target whose power is controlled of the plurality of modules, and
the second power source control device controls the power of a module held by the control target holding unit.

9. The image forming apparatus according to claim 8, wherein a module held by the control target holding unit is set so that power supplied from the power source device in a case where the power of the module held by the control target holding unit is turned off is suppressed to within an upper limit of power that can be supplied in a case where the PFC circuit is turned off.

10. The image forming apparatus according to claim 1, further comprising a control device configured to control the image forming apparatus, wherein the control device performs control so as to turn off the power of a peripheral device mounted on the image forming apparatus before turning off the PFC circuit.

11. The image forming apparatus according to claim 10, wherein the peripheral device is at least one of a printer device, a scanner device, a storage device, and an operation device.

12. The image forming apparatus according to claim 10, wherein the control device reduces a clock frequency at which the control device is caused to operate lower than a clock frequency in a state where the PFC circuit is on before turning off the PFC circuit.

13. The image forming apparatus according to claim 1, wherein:
the PFC circuit has a transistor which is turned on and off in order to improve a power factor;
a state in which the PFC circuit is on is a state in which control is performed to turn on and off the transistor in the PFC circuit; and
a state in which the PFC circuit is off is a state in which the control is not performed and the transistor in the PFC circuit is off at all times.

14. A control method executed by an image forming apparatus comprising a power source unit having a PFC (Power Factor Correction) circuit, a first power source control device that controls the PFC circuit, and a semiconductor integrated circuit including at least one module for performing image processing, wherein the first power source control device and the semiconductor integrated circuit are connected by a power control signal,
the control method comprising:
in a case of causing the image forming apparatus to make a transition from a normal mode into a power-saving mode:
the first power source control device controlling the power control signal to the semiconductor integrated circuit so as to turn off the power of the module; and
the first power source control device, after controlling the power control signal to the semiconductor integrated circuit so as to turn off the power of the module, performing control so as to turn off the PFC circuit.

15. The control method according to claim 14, further comprising, in a case of causing the image forming apparatus to make a transition from the power saving mode into the normal mode:
the first power source control device performing control so as to turn on the PFC circuit; and
the first power source control device, after performing control so as to turn on the PFC circuit, controlling the power control signal to the semiconductor integrated circuit so as to cancel the turn-off of the power of the module.

16. An information processing apparatus which performs data processing, comprising:
a power source unit that converts AC (alternating current) power input into the power source unit into DC power, wherein the power source unit has a PFC (Power Factor Correction) circuit for correcting a power factor of the AC power;
a semiconductor integrated circuit including at least one module for performing a predetermined data processing; and
a power source control device that controls whether to enable or disable the PFC circuit, and to control a power control signal input into the semiconductor integrated circuit so that the power of the PFC circuit is enabled while the power of the module in the semiconductor integrated circuit is on.

17. The information processing apparatus according to claim 16, wherein, while the PFC circuit is enabled, control is performed to correct the power factor of the AC power, and while the PFC circuit is disabled, the control to correct the power factor of the AC power is not performed.

18. The information processing apparatus according to claim 17, wherein the PFC circuit has a transistor which is turned on and off to correct the power factor of the AC power, and the control being performed by the PFC circuit to correct the power factor of the AC power is controlled to turn on and off the transistor.

19. The information processing apparatus according to claim 16, wherein the power source control device controls whether to enable or disable the PFC circuit, and controls the power control signal so as to turn off a power of the module before disabling the PFC circuit and to cancel the turn-off of the power of the module after enabling the PFC circuit.

20. The information processing apparatus according to claim 16, wherein the information processing apparatus is operable at least in a first power state and a second power state in which power consumption is less than the first power state, and
the power source control device performs the control so as to enable, based on a detection of an event to shift the information processing apparatus from the second power state into the first power state, the PFC circuit before turning on the power of the module.

21. The information processing apparatus according to claim 20, wherein the power source control device performs the control so as to disable, based on a detection of another event to shift the information processing apparatus from the first power state into the second power state, the PFC circuit after turning off the power of the module.

* * * * *